March 2, 1954     W. S. KINNARD     2,670,918
TRIPOD WITH LOCKABLE HELICAL-SPIRAL LEGS
Filed Feb. 21, 1948     3 Sheets-Sheet 1
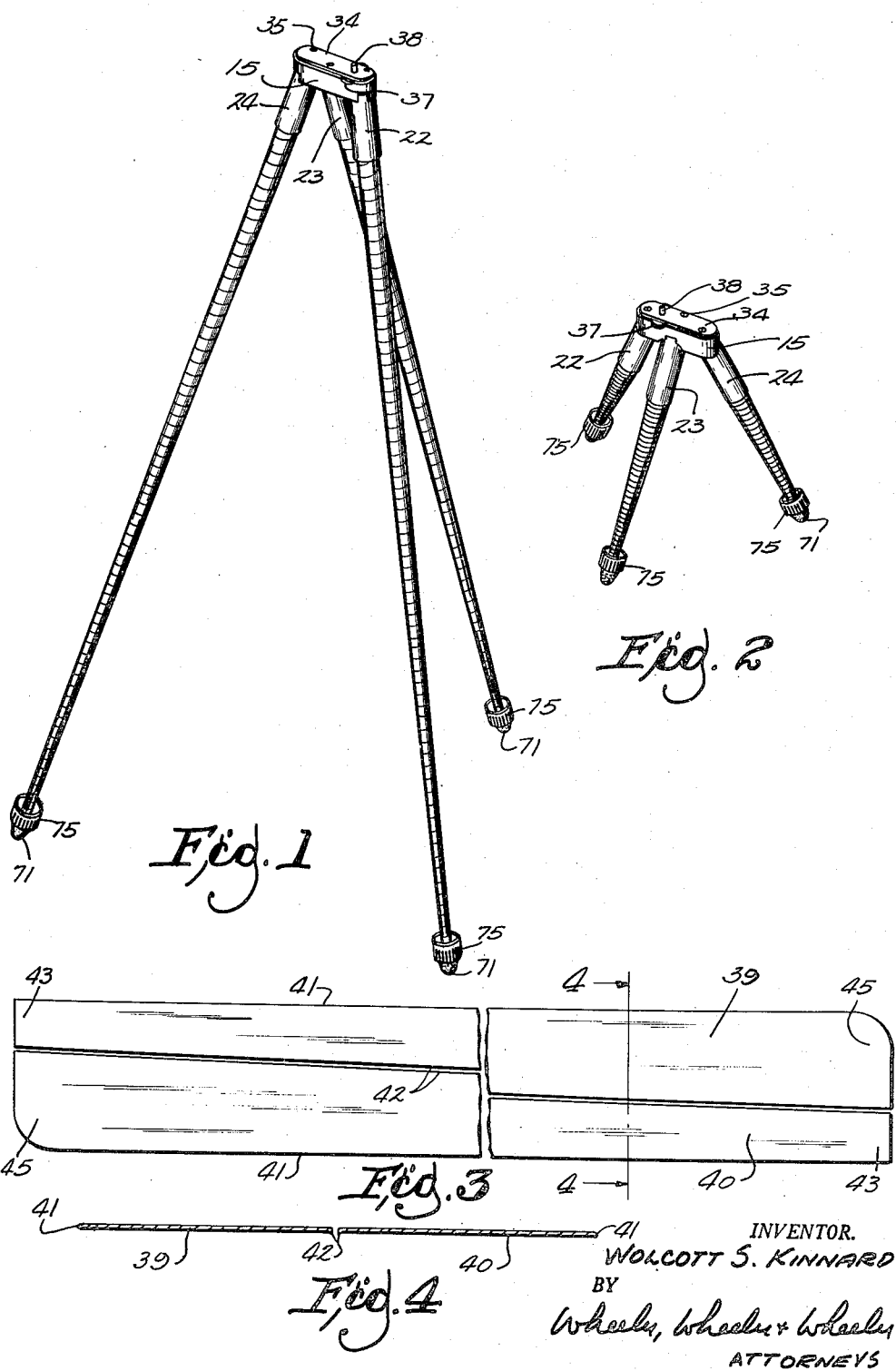
INVENTOR.
WOLCOTT S. KINNARD
BY
Wheeler, Wheeler & Wheeler
ATTORNEYS

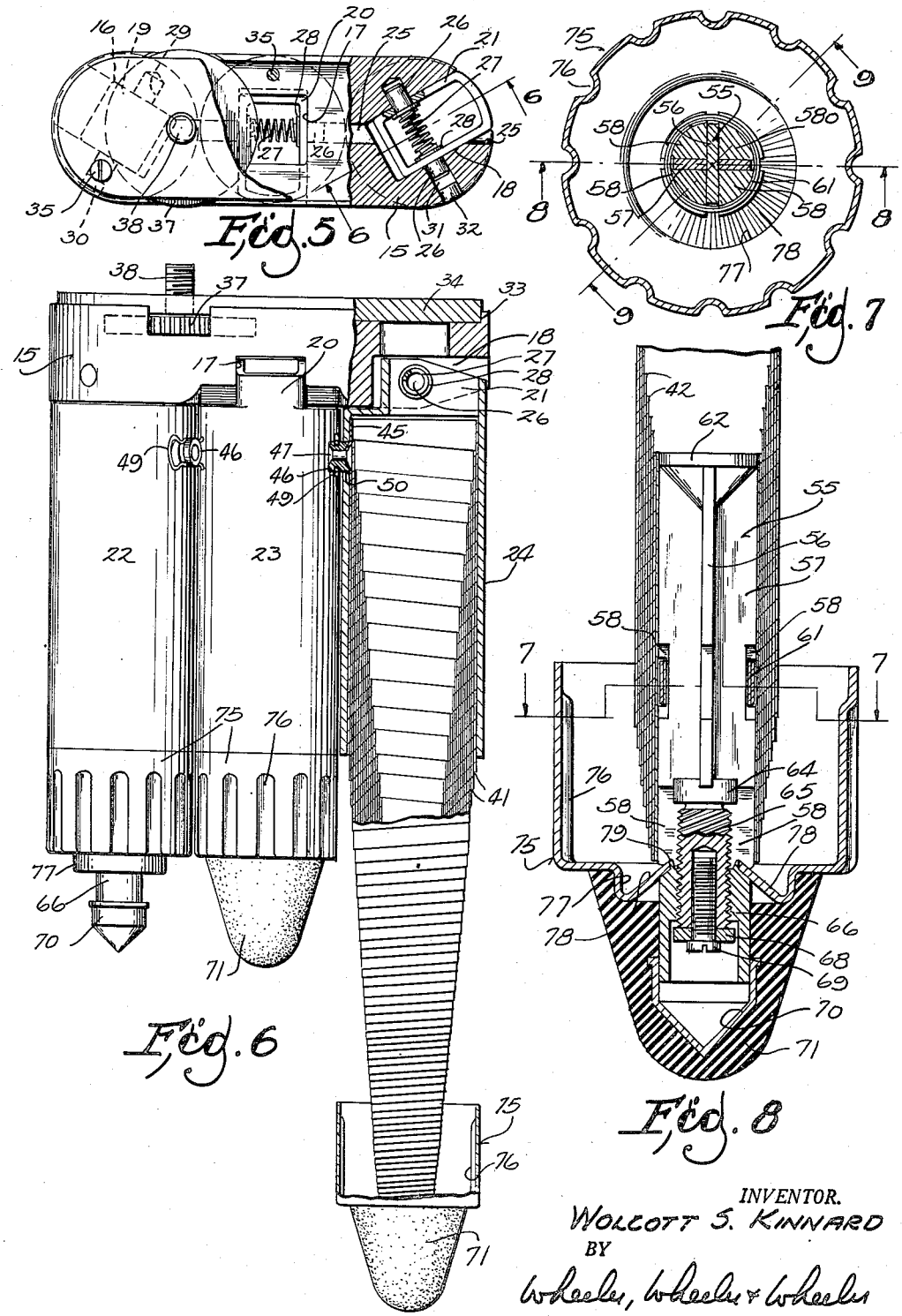

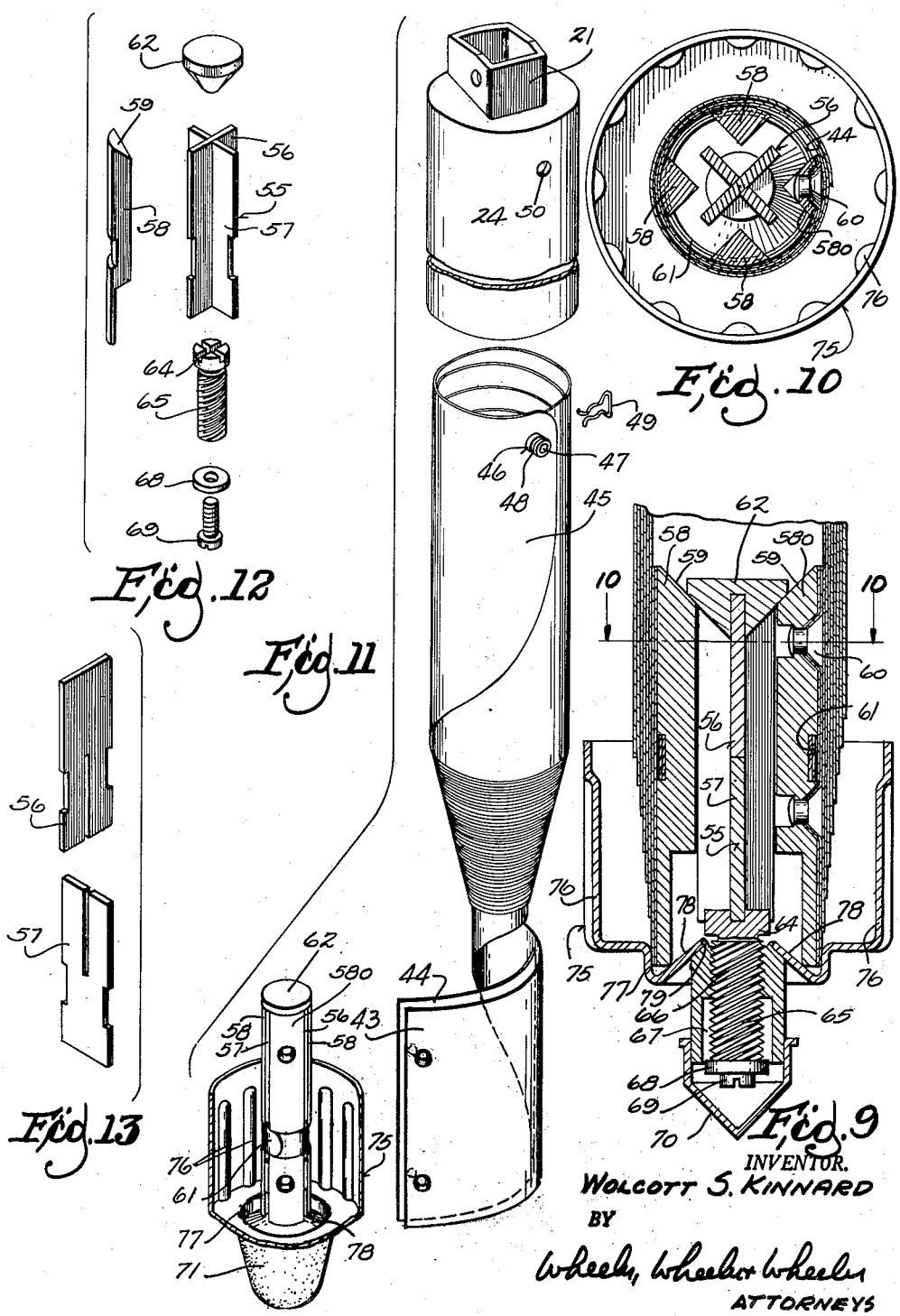

Patented Mar. 2, 1954

2,670,918

UNITED STATES PATENT OFFICE 2,670,918

TRIPOD WITH LOCKABLE HELICAL-SPIRAL LEGS

Wolcott S. Kinnard, Milwaukee, Wis.

Application February 21, 1948, Serial No. 10,024

14 Claims. (Cl. 248—191)

This invention relates to a tripod with lockable helical-spiral legs.

My improved tripod is particularly designed as a camera tripod but is adaptable for any purpose and will sustain great load in any position of adjustment in which its legs may be locked. It is the object of the invention to provide a tripod which collapses so compactly that it may readily be carried in the pocket and which may, nevertheless, be extended to a height of five feet or more, or any intermediate adjustment, and locked.

It is a more specific object of the invention to provide a novel and improved means for locking in any desired adjustment an axially extended helical-spiral leg.

It is another object of the invention to provide a novel relationship between a tripod head and the several telescopically extensible legs thereof, whereby the legs fold into the same plane when collapsed, but open at different angles to provide a rigid and well braced support for the head. In this connection, it will be noted from the following disclosure of the invention that when the legs are collapsed into a common plane, the head also lies in such plane, making a very compact organization. It will also be noted that the projected axes of the open legs do not intersect at a common point, as in the usual tripod. A further specific detail included in my objectives is the provision of a novel arrangement for mounting the legs pivotally in the head without exposing any mounting pintles.

The foregoing and other objects will be more apparent from the following disclosure of the invention.

In the drawings:

Fig. 1 is a view in perspective showing a fully opened tripod made in accordance with my invention.

Fig. 2 is a view in perspective showing the same tripod as it appears when opened for table top use.

Fig. 3 is a plan view showing the pattern of the metal sheets from which the individual legs of such a tripod are cut.

Fig. 4 is a detail view in cross section taken on the line 4—4 of Fig. 3.

Fig. 5 is a plan view of a tripod embodying my invention, portions of the head being broken away to expose the interior construction.

Fig. 6 is a side elevation of a tripod embodying my invention, portions thereof being broken away to a section indicated on the line 6—6 of Fig. 5, the legs so broken away being partially extended.

Fig. 7 is a view taken in section on the line 7—7 of Fig. 8.

Fig. 8 is a fragmentary enlarged detail view in axial section through a portion of the foot and locking device of one of the tripod legs in the section indicated at 8—8 in Fig. 7.

Fig. 9 is a view taken on the section indicated by line 9—9 of Fig. 7 and shows the parts suggested to locking position.

Fig. 10 is a transverse sectional view taken on the line 10—10 of Fig. 9.

Fig. 11 is a view in perspective showing slightly separated a leg socket, a helical-spiral leg member slightly extended at its smaller end, and the locking cup at the leg tip broken away to expose the collet to which the expanded smaller end portion of the leg is attachable.

Fig. 12 is a detail view in perspective showing in separated positions the component parts of the collet expander and one of the collets.

Fig. 13 is a detail view in perspective illustrating the component parts of the collet divider which is used in the expander shown in Fig. 12.

The tripod head 15 is provided at 16, 17 and 18 with downwardly opening recesses, preferably of rectangular section, to receive the correspondingly formed bearing portions 19, 20 and 21 respectively of the socket members 22, 23 and 24 of the several legs. The opposed parallel faces of the said bearing portions are closely fitted within the corresponding surfaces of the recesses in the head, whereby the socket members are guided for pivotal movement upon the axes provided.

In order that my improved tripod may be neatly and smoothly finished with no rough edges, it is desired to conceal the pintles upon which the legs are pivoted. To this end, I provide blind sockets for the pintles. It will be observed from Fig. 5 that the tripod head 15 is laterally elongated with rounded ends. The central leg socket 23 has its bearing portion 20 pivoted upon an axis which corresponds to the longitudinal axis of the head. A hole drilled into the head longitudinally at 25 from one end thereof, partially intersects the recess 18 as shown in Fig. 5. The portions of this bore immediately adjacent the recess 17 receive pintle buttons which project laterally from the bearing portion 20 of socket 23. These buttons are alike on all three of the legs and are shown in detail as applied to the bearing portion 21 of socket 24 in Fig. 5.

Between opposite buttons 26 is a compression spring 27 which projects the buttons from the apertures in the bearing portion of the socket member. Each button has a head or flange at 28 engageable with the interior surface of the socket member to limit the outward movement of the button under compression of spring 27. By compressing the spring 27, the buttons 26 may be brought sufficiently close together to be removed from the bearing portion 21 of the leg socket or to be introduced into the lateral apertures with which the leg socket is provided. When expanded into such lateral apertures, the buttons project from the bearing portion to provide diametrically opposite pintle studs.

The bore 29 for the pintle studs of leg socket 22 enters the tripod head 15 obliquely, as shown in Fig. 5, and its outer end is plugged at 30 as best shown in Fig. 6. The bore 31 for the retractible pintle studs of the bearing portion 21 of like socket 24 also enters obliquely, at an opposite angle and is plugged at 32 as shown in Fig. 5.

The top of the tripod head 15 is recessed at 33 to receive a cover plate 34, the removal of which exposes the upper ends of the bearing recesses 16, 17 and 18 and the upper ends of the hollow bearing elements 19, 20 and 21 disposed therein. This renders the springs 27 and the relatively expansible pivot studs 26 readily accessible when the screws 35 holding cover plate 34 are released. The recess 33 in the tripod head is also formed to receive the head 37 of the camera mounting screw 38 which projects upwardly through cover plate 34, the knurled head 37 being exposed at the sides of the tripod for manipulation.

As will hereinafter be described, the camera legs nest into the socket members 22, 23 and 24. At this point, it is desired to observe only that when the legs are so nested and the members 22, 23 and 24 are folded to the position shown in Figs. 5 and 6, the tripod is extremely compact. Fig. 6 illustrates the actual commercial device in full scale. The several sockets 22, 23 and 24 all lie in the plane of the head. As a result, there is no point at which the projected axes of the several legs can be extended to meet. Yet the open tripod is extremely rigid when the legs are spread as shown in Fig. 1 or 2.

Each of the legs is made of a spirally wound strip of sheet metal which may be extended by drawing it out axially to helical-spiral form. For economies in material and for reduction in weight, it is preferred that the strip of stock of which each leg is wound shall be tapered in width from one end to the other, the greater width of the strip being at the upper end of the leg, which has the greater diameter. When such a spirally wound strip is drawn out axially, it will tend to distribute the axial extension between its several coils in such a way that there will be a greater axial extension at the end where the coils have the largest diameter. Thus the greatest width of the strip or blank from which the leg is made is used at the larger end of the strip and the strip progressively decreases in width in order to maintain an approximately comparable overlap of the respective coils throughout the length of the extended leg from its larger to its smaller end.

While a variety of materials may be used, I have found it expedient to use stainless steel spring stock of full spring temper (40 Rockwell) in order to secure the necessary tensile strength of the material (which spring steel has) and also in order that the resilience of the stock may assist in properly spacing the coils and distributing the locking compression throughout the several coils constituting the leg. Stainless steel is preferred because of its freedom from corrosion. Incidentally, the only material which I have thus far found for the lubrication of the leg is an extremely fine talcum powder.

Fig. 3 and Fig. 4 show the blank from which the individual leg strips are cut. In practice, I have successfully employed a blank five inches wide and twelve feet long. I cut this angularly to produce two strips 39 and 40 which are identical, each being three and one-fourth inches wide at its wider end and one and three-fourths inches wide at its narrow end. It will be noted that each of these strips has a finished margin at 41 and a raw edge 42 with a slight burr where the shearing action has occurred. In winding the strips, I take pains to dispose the burred edge on the interior of the tripod leg, thus making unnecessary any refinishing operation.

I have found the thickness of the metal to be somewhat critical. A thickness of .005 inch is preferred. A thickness of .004 is not sufficiently strong, while a thickness of .006 will add a half pound of weight to the tripod.

Each of the identical blanks 39 and 40 will provide a separate leg. To the smaller end 43 of the strip, I attach a reenforcing plate 44. The reenforcing plate and the contiguous end of the strip are preferably formed in advance to the arc which these will assume in use. (In fact, the whole strip may desirably be given a preliminary "set" in the arc of the respective coils.)

Fig. 11 is greatly exaggerted in showing the leg pulled out at its smaller end without the corresponding extension throughout its length which it will naturally tend to assume in practice. The thicknesses of the metal are also necessarily exaggerated in the several views. Figs. 7 to 11 show the parts at twice their actual size, but even at this enlargement some exaggeration of the metal thickness is necessary.

At its larger end 45, each of the strips is provided with a tubular locking boss at 46 anchored by a rivet 47 and peripherally grooved at 48 to receive the locking spring 49. The end coil is pulled axially from the strip to enable it to be bent inwardly so that the boss will clear the socket. It is then slipped into the appropriate socket member 22, 23 or 24 until the boss registers with an aperture 50 in the side of such member (see Figs. 6 and 11). When such registration occurs, the locking boss will spring outwardly through the aperture and the detent spring 49 is engaged therewith to maintain the assembly.

A major feature of the present invention consists in the locking means at the lower end of each leg whereby all of the convolutions comprising the leg may be frictionally engaged with each other throughout the length of the leg to withstand a load far greater than any which will be imposed upon the apparatus in practice. This locking device is best shown in Figs. 7 to 13.

At the core of the locking device, there is a collet guide 55 which may conveniently and inexpensively be made by notching a pair of plates 56, 57 (Fig. 13) so that they may be interengaged to make up the collet guide 55 in cruciform cross section. Between the radial partition arms of the collet guide 55 are disposed a like number of segmental collets 58 having beveled upper ends at 59. To one of these at 580, which is identical with the others except that it is apertured, I connect by rivets 60 the lower and smaller extremity of the spirally wound strip constituting the leg, the reenforcing plate 44 intervening. All of the collets, and also the sides of the collet guide 55, are notched to receive a contractile spiral retaining spring 61, the sole purpose of which is to hold the collets assembled to the guide, and assure uniformity of collet movement.

The upper end of the guide carries a cone 62 bearing against the beveled faces 59 of the respective collets. The cone and the guide are integrally joined by solder or otherwise to function as one piece.

Similarly joined to the lower end of the guide is the head 64 of screw 65, the head being provided with a cruciform slot to receive the ends of the intersecting plates 56 and 57, constituting the guide. In this slot, the said ends are integrally secured, as by solder, so that the screw and the guide and the conical cap 62 all constitute one unitary part.

Threaded upon the screw 65 by a high pitch multiple thread is a nut 66 having a socket 67 in which is reciprocable the stop washer 68 anchored by screw 69, which is threaded into the end of screw 65. The tripod point 70 is a pressed fit over the end of nut 66 to enclose the stop washer 68 and it may be further enclosed, if desired, by a rubber foot 71, the elasticity of which enables it to be snapped over the pointed foot 70 as shown in Fig. 8.

The handle for manipulating the nut 66 is a cup-shaped member 75 which is preferably fluted at 76. The diameter of this member preferably corresponds substantially with the diameter of the respective socket member 22, 23, 24. Its annular bottom is channeled downwardly to provide a shoulder at 77 and thence extends upwardly to constitute the frustum of a cone at 78. The upper end of the nut 66 is shouldered to receive the portion 78 of the operating member 75 and is upset thereover at 79 so that the operating handle 75 and nut 66 are rotatable as a unit.

In the position of the parts shown in Figs. 7 and 8, the nut 66 has been threaded downwardly on screw 65 substantially to the limit fixed by the stop washer 68. In this position of the parts, the collets 58 (omitted from Fig. 8) have been contracted by the spring 61, such contraction being permitted by the separation of the fixed cone 62 carried by the core and the movable frustoconical surface 78 carried by the adjusting handle 75. In this position of the parts, the operator can freely collapse or extend the leg to any desired length within its capacity. Arriving at the desired length, it is only necessary for the operator to grasp the leg in one hand and rotate the handle 75 with the other in a direction to tighten the nut 66 upon the screw 65, thereby bringing toward each other the opposed conical surfaces provided by the conical cap 62 and the frustoconical portion 78 of the handle. This will expand the collets 58 thereby initiating an outward pressure on the innermost coil of the helical spiral-leg.

It will be observed that the only thing which keeps the inner core, including screw 65, from rotating with the handle 75 is the resistance of the ribbon constituting the leg. This resistance is not absolute and during the initial rotation of the handle for locking purposes, there will be some tendency for the innermost coil of the leg to rotate. However, such rotation occurs in a direction tending to expand the innermost coil, the pitch of the leg being in the same direction as the pitch of screw 65. Thus, any tendency of the innermost coil of the spring metal strip constituting the leg to rotate with the handle 75 merely distributes the locking pressure upwardly throughout the leg. Ultimately, the locking pressure will be substantially uniformly distributed between all convolutions of the strip constituting the leg and each such convolution will be frictionally locked to the contiguous convolutions with such firmness that great loads can be imposed on the leg without occasioning the collapse thereof.

Rotation of the locking handle 75 in a reverse direction on screw 65 will separate the opposing cones between which the collets are confined, thereby releasing the clamping pressure. Only a moment is required to lock each leg in its adjustment or to release each leg for readjustment or collapse.

The adjustment is infinite within the capacity of the device. Each leg may be adjusted to any length whatever from the contracted position shown in full scale in Fig. 6 to a total height which may amount to five feet or more, in the particular construction described.

For the purposes of the appended claims, the individual legs may be regarded as expansible and contractible struts. While the adjustable clamping means herein disclosed acts outwardly upon the innermost coil of the spring strip constituting the strut, it is a matter of choice where the clamping device is located. In fact, where the material used is a spring strip, as in the device disclosed, a certain amount of clamping action is exerted by the fact that the spring strip tends to expand and is confined by the tubular shell 24 at its larger end. This results in binding pressure which is communicated throughout the strut enabling it to withstand light loads, even without the adjustable means for clamping it at its other end.

I claim:

1. An extensible and collapsible strut in combination with means for locking the strut against relative change in length, the strut comprising a spirally wound elastic tape having its coils axially displaceable to vary the length of the strut, the locking device comprising an expander within the innermost coil, and an actuator comprising relatively movable parts for actuating said expander, one of said parts being provided with a handle comprising a foot extending axially beyond the innermost coil and the other of said parts being connected with the expander.

2. The combination set forth in claim 1 in which the expander comprises a core element having a conically tapered head and collets guided upon the core element and engaged with the head, at least one of said collets being connected with the innermost coil aforesaid.

3. The combination set forth in claim 1 in which the expander comprises a core element connected with the said other part and having a conically tapered head, the member part provided with the handle having an opposed conically tapered surface, and a set of collets guided by the core element and confined within the innermost coil and between the tapered head and the tapered surface aforesaid whereby the relative approach of said head and surface upon relative rotation of the screw and nut effects expansion of the collets within said innermost coil, at least one of the collets being connected with the innermost coil.

4. An expansible and contractable strut comprising a tubular shell, a spirally wound strip having an axial dimension such that the wound strip is substantially receivable within the shell, said strip having a series of coils subject to axial displacement whereby the innermost coil may be withdrawn axially to extend said strip as a strut from said shell, means for frictionally locking the coils to each other and a handle for locking and releasing said means, said handle comprising a cup in which the smallest coil of said strip is disposed, said cup being registered with the end of the shell when the strip is collapsed, to constitute a closure for the end of the shell.

5. An expansible and contractable strut comprising a spirally coiled strip, the successive coils being axially extensible and contractable, a cruciform core within the smallest coil of said strip having collet-receiving angles, collets disposed in said angles, a conical expanding head connected with the core, a screw connected with the head, a nut provided with a handle, the nut and handle having a tapered cam surface opposite that of said head, the nut being threaded to the screw for effecting the advance and retraction of the head and said surface relative to each other for expanding the collets, the innermost coil of said strip being connected with one of the collets.

6. In a tripod, the combination with a head having recesses in its under surface, one of said recesses opening laterally and the other two opening obliquely toward the opposite side of the head, and axially extensible legs comprising tubular shells having extensions disposed in their respective recesses and provided with means pivoting them individually to said head, the said shells normally lying in a common plane and being pivotally movable in said recesses from said plane, said head being provided with sockets opening into the respective recesses and said extensions being apertured and provided with axially movable studs projecting oppositely from said extensions and engageable in the respective sockets, said studs having interposed springs urging them outwardly to positions for such engagement and having limiting flanges within the extensions limiting their outward projection.

7. In a tripod, the combination with a head having recesses in its under surface, one of said recesses opening laterally and the other two opening obliquely toward the opposite side of the head, and axially extensible legs comprising tubular shells having extensions disposed in their respective recesses and provided with means pivoting them individually to said head, the said shells normally lying in a common plane and being pivotally movable in said recesses from said plane, said head being provided with sockets opening into the respective recesses and said extensions being apertured and provided with axially movable studs projecting oppositely from said extensions and engageable in the respective sockets, said studs having interposed springs urging them outwardly to positions for such engagement and having limiting flanges within the extensions limiting their outward projection, said head being provided with a cover plate in removable connection therewith, said cover plate affording access to said recesses.

8. A tripod comprising the combination with an elongated head having recesses opening downwardly, one of said recesses having parallel sides at right angles to the elongation of said head and the other recesses having parallel sides disposed obliquely to each other and to the sides of the recess first mentioned, tubular shells having upward extensions disposed in the recesses and substantially fitting between the parallel sides thereof, the said head having blind sockets in aligned pairs opening through the sides of the recesses opposite said extensions, and opposed pivot studs mounted in the respective extensions and engaged in said sockets whereby the respective shells are pivoted to said head, the said head being provided with a removable cover plate adapted when removed to expose said recesses, the cover plate having a camera mounting screw rotatable therein, and the head having a recess beneath the plate in which the head of said screw is confined, the diameter of said head screw being such as to expose the periphery thereof beyond said tripod head.

9. The combination set forth in claim 8 in further combination with extensible and retractable legs mounted in the respective shells when retracted and adapted to be extended therefrom, each of said legs comprising a spirally coiled spring having its outermost coil connected to the shell and its inner coils axially extensible from the shell, the innermost coil being connected with an expander, said expander including a handle constituting a closure for the shell in the retracted position of the leg.

10. The combination set forth in claim 9 in which the expander comprises collet means, a core comprising a screw and a cam connected therewith, and a nut connected with said handle and having a complementary cam, the respective cams acting on the collet means to expand the innermost coil of said spring.

11. In a tripod, the combination with a tripod head of horizontally elongated form and provided with a first recess opening at one side and second and third recesses opening obliquely at the other side, said head providing opposing bearing surfaces at the sides of all of said recesses and having sockets in the said surfaces, of shells having downwardly opening cavities of circular section and having anchorage portions with bearing surfaces fitting and engaging those of the several recesses, whereby to be guided from said walls for movement in a predetermined plane, and studs connected with the respective anchorage portions and engaged in the sockets of said walls for pivotal connection of said shells to said head, and axially extensible legs normally housed in the cavities of the respective shells and extensible therefrom for the support of said head, the several shells being movable upon their pivots from a common plane extending longitudinally of said head to positions of lateral extension for the stable support of said head, each of said extensible legs being provided at its lower end with a unitarily mounted cup constituting, in the collapsed position of the leg, a closure for the shell in which such leg is housed.

12. The device of claim 11 in which the respective studs are retractively mounted in the anchorage portions of said shells and provided with compression springs urging them outwardly into the sockets of said head.

13. An extensible and collapsible strut comprising a spirally wound elastic strip and a clamp disposed within the strip and expansibly engageable with contiguous coils for locking such coils against axial displacement, said clamp comprising parts in screw-threaded connection and disposed within the coils of said strip for relative movement axially of the strut, one of said parts being connected with one of the coils of said strip to be restrained against rotative movement therein and the other of said parts being provided with a handle exposed at the end of the strut for manipulation, said handle further comprising a foot axially extending from said strut, and a clamping element confined between the said parts and radially displaceable into clamping engagement interiorly with the said coils upon the rotation of the part provided with a handle in a direction to advance it axially of the strut upon its threaded connection with the coil-connected part, the said parts having shoulders abutting said element, said element and the shoulder of at least one of said parts being complementarily beveled for effecting expanding movement of said element upon the approach of said parts.

14. An expansible and collapsible strut comprising a spirally wound elastic strip having coils axially extensible and collapsible, and a clamp disposed within the strut and including collet elements radially movable into clamping engagement interiorly with a plurality of coils for causing said coils frictionally to engage other coils of said strut, an expander having a shoulder with which said collet elements are engaged and having radial partitions defining said collet elements in which said collet elements are disposed, one of said collet elements having a mechanical connection with one of said coils whereby to restrain the expander and collet elements from rotation, a screw-threaded extension connected with the expander, and a handle exposed outside of said strut and having a stem in screw-threaded connection with said extension, and a shoulder connected with the handle engaged with the collet elements in opposition to the expander shoulder aforesaid, the collet elements and at least one of said shoulders having complementary beveled surfaces for forcing the collet elements radially upon the approach of said shoulders.

WOLCOTT S. KINNARD.

References Cited in the file of this patent

UNITED STATES PATENTS

| Number | Name | Date |
|---|---|---|
| 289,179 | Tregurtha | Nov. 27, 1883 |
| 449,028 | Beilmann | Mar. 24, 1891 |
| 2,019,753 | Wittel | Nov. 5, 1935 |

FOREIGN PATENTS

| Number | Country | Date |
|---|---|---|
| 5,161 | Great Britain | of 1900 |
| 127,530 | Austria | Nov. 15, 1931 |
| 718,486 | France | Nov. 4, 1931 |
| 737,199 | France | Oct. 3, 1932 |